United States Patent [19]
Nogiwa et al.

[11] Patent Number: 5,633,750
[45] Date of Patent: May 27, 1997

[54] OPTICAL FIBER AMPLIFIER

[75] Inventors: Seiji Nogiwa, Tokyo; Kazuo Aida, Yokohama; Kiyoshi Nakagawa, Miura-gun, all of Japan

[73] Assignees: Ando Electric Co., Ltd.; Nippon Telegraph and Telephone Corporation, both of Tokyo, Japan

[21] Appl. No.: 641,218

[22] Filed: Apr. 30, 1996

[30] Foreign Application Priority Data

May 1, 1995 [JP] Japan ................................. 7-107696

[51] Int. Cl.⁶ ................................................. H01S 3/00
[52] U.S. Cl. ................................................. 359/341; 359/177
[58] Field of Search ................................. 359/341, 337, 359/177, 176

[56] References Cited

U.S. PATENT DOCUMENTS

| | | |
|---|---|---|
| 5,374,973 | 12/1994 | Maxham et al. ............... 359/341 |
| 5,471,334 | 11/1995 | Masuda et al. ............... 359/177 |
| 5,506,724 | 4/1996 | Shimizu et al. ............... 359/341 |

*Primary Examiner*—Mark Hellner
*Attorney, Agent, or Firm*—Finnegan, Henderson, Farabow, Garrett & Dunner, L.L.P.

[57] ABSTRACT

The invention offers an optical fiber amplifier with good frequency characteristics which allows the gain to be held constant even without an input signal beam and allows gain control with respect to input optical signals with high-speed power fluctuations. An excitation beam source 8 supplies an excitation beam for light amplification and a control beam source 15 supplies a control beam for controlling the gain to an EDF 4 which amplifies a signal beam by means of optical excitation. An excitation beam monitor 9 measures the power of the excitation beam when inputted to the EDF 4 and an excitation beam monitor 12 measures the power of the excitation beam when outputted from the EDF 4. A comparator 11 calculates the ratio between the power measured by the excitation beam monitor 9 and the power measured by the excitation beam monitor 12. A drive circuit 14 controls the power of the control beam supplied by the control beam source 15 based on the results obtained by the comparator 11.

16 Claims, 4 Drawing Sheets

# OPTICAL FIBER AMPLIFIER

BACKGROUND OF THE INVENTION

1. Technical Field of the Invention

The present invention relates to optical fiber amplifiers which are suitable for use as optical amplifiers in the fields of optical communications, optical measurement, and the like.

2. Background Art

Semiconductor laser amplifiers and rare-earth-doped optical fibers (hereinafter referred to as EDFs) and the like are examples of optical amplifiers which amplify and output inputted optical signals while in the form of light. However, such optical amplifiers have the drawback that their gain depends upon the power of the input optical signal. Specifically with regard to EDF amplifiers, the gain decreases as the power of the input optical signal increases. Various gain control methods have been proposed for overcoming this drawback.

In one example of such a gain control method, the input optical signal and the output optical signal are simultaneously measured in order to make a comparison between the input beam and the output beam. Based on these comparison signals, feedback is applied to the drive current of the laser diode in the case of semiconductor laser amplifiers and to the electrical power of the excitation beam source (the light source required for amplification) in the case of EDF amplifiers, in order to control the gain so as to hold it constant.

As another example in the case of EDF amplifiers, the power of the excitation beam entering the EDF and the power of the beam emitted by the excitation beam source of the EDF are simultaneously measured. Their ratio is calculated to obtain the gain of the EDF amplifier, which is then used to apply feedback to the power of the excitation beam source in order to control the gain so as to hold it constant.

Thus, in conventional EDF amplifiers, the gain is controlled by adjusting the power of the excitation beam based on calculated gain values in order to apply feedback to the EDF. However, there is a problem in that the gain is not able to be controlled at high speeds because the response rate of the population inversion of the excitation beam in the EDF is too slow. More specifically, in an EDF, the relaxation time of spontaneous emission from the upper state $^4I_{13/2}$ to the lower state $^4I_{15/2}$ (approximately equal to the lifetime of the upper state $^4I_{13/2}$) is about 10 milliseconds. Consequently, even if the power of the excitation beam source is changed, the population inversion of the EDF is not able to catch up fast enough.

Furthermore, with the method wherein the gain is controlled by comparing the powers of the input and output optical signals, the gain cannot be controlled at a constant value when there is no input optical signal, so that when the next optical signal is inputted, the gain is not able to be controlled very quickly.

SUMMARY OF THE INVENTION

The present invention has been made in view of the above-given background art, and has the object of offering an optical fiber amplifier having good frequency characteristics, which allows the gain to be controlled at a constant level even without the presence of an input optical signal and allows the gain to be controlled in response to input optical signals with swiftly varying powers.

In order to resolve the above problems, the present invention is an optical fiber amplifier, comprising a rare-earth-doped optical fiber for amplifying a signal beam; optical excitation means for supplying an excitation beam to said rare-earth-doped optical fiber for amplifying said signal beam; first measurement means for measuring the power of said excitation beam when inputted to said rare-earth-doped optical fiber; second measurement means for measuring the power of said excitation beam when outputted from said rare-earth-doped otpcial fiber; calculation means for calculating the ratio between the power measured by said first measurement means and the power measured by said second measurement means; control beam supply means for supplying a control beam which controls the gain of said rare-earth-doped optical fiber; and control means for controlling the power of said control beam based on the ratio calculated by said calculation means.

PREFERRED EMBODIMENTS OF THE INVENTION

The first embodiment of the present invention will be explained below with reference to the drawings.

A. First Embodiment

(1) Structure

Figure 1:
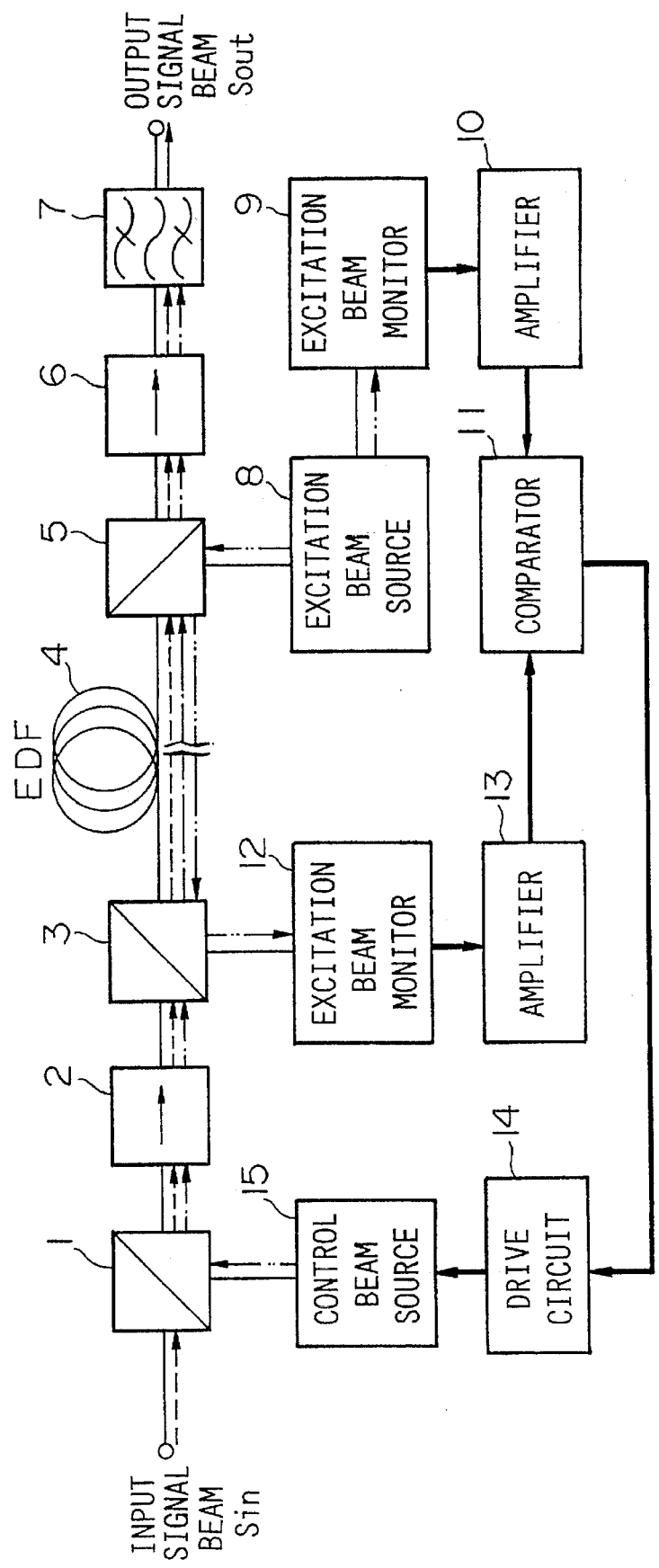
FIG. 1 is a block diagram showing the structure of an optical fiber amplifier according to the first embodiment of the present invention.

FIG. 1 is a block diagram showing the first embodiment of the optical fiber amplifier according to the present invention. In the diagram, the thin solid lines represent optical signal connections, while the thick solid lines represent electrical signal connections.

An input signal beam $S_{in}$ is made incident upon an optical combiner 1. In addition to the input signal beam $S_{in}$, a control beam emitted by a control beam source 15 (to be explained below) is inputted to the optical combiner 1.

The optical signal emitted from the optical combiner 1 is inputted to an isolator 2. The isolator 2 allows passage of optical beams in only the direction of the arrow shown in the drawing.

The optical signal which has passed through the isolator 2 is inputted to one terminal of a wavelength division multiplexer 3. The wavelength division multiplexer 3 is for combining or separating two optical signals of different wavelengths. The other two terminals of the wavelength division multiplexer 3 are respectively connected to an excitation beam monitor 12 (to be explained below) and one terminal of a wavelength division multiplexer 5 via an EDF 4.

The EDF 4 is an optical fiber doped with a rare earth element such as erbium, which amplifies the input signal beam $S_{in}$ by optical excitation which will be explained below. The other two terminals of the wavelength division multiplexer 5 are respectively connected to an excitation beam source 8 (to be explained) and an isolator 6. The optical signal which has passed through the isolator 6 is inputted to a BPF (band-pass filter) 7 which allows the passage of optical signals of only specific wavelengths, and after passing through the BPF 7, the optical signal is outputted as an output signal beam $S_{out}$.

The excitation beam source 8 is for providing the EDF 4 with an excitation beam, which is inputted to the wavelength division multiplexer 5 and an excitation beam monitor 9. The excitation beam monitor 9 measures the power of the excitation beam generated by the excitation beam source 8 and outputs an electrical signal. The output signal of the excitation beam monitor 9 is amplified by the amplifier 10 and inputted to a comparator 11. The excitation beam monitor 12 measures the power of the excitation beam inputted via the wavelength division multiplexer 5, the EDF 4 and the wavelength division multiplexer 3, and outputs an electrical signal. The output signal of the excitation beam monitor 12 is amplified by the amplifier 13 and inputted to the comparator 11.

The control beam source 15 generates a control beam in accordance with a drive current supplied by a drive circuit 14. The control beam outputted from this control beam source has a wavelength different from that of the input signal beam $S_{in}$, the wavelength of the control beam being within the gain region of the EDF 4 and outside of the band of the bandpass filter 7 (the 1.5 μm band in the present embodiment). At this time, the drive current outputted by the drive circuit 14 controls the power of the control beam outputted by the control beam source based on the output signal of the comparator 11 so that the ratio between the output of the amplifier 10 and the output of the amplifier 13 is held constant.

(2) Operation

The input signal beam $S_{in}$ passes through the optical combiner 1, the isolator 2 and the wavelength division multiplexer 3 to enter the EDF 4, then passes through the wavelength division multiplexer 5, the isolator 6 and the bandpass filter 7 to be withdrawn as an output signal. FIG. 1 shows the propagation path of this signal beam with a dashed line.

The control beam outputted from the control beam source 15 is combined with the input signal beam $S_{in}$ by means of the optical combiner 1 and passes through the isolator 2 and the wavelength division multiplexer 3 to enter the EDF 4. At this time, the control beam amplified and outputted by the EDF 4 passes through the wavelength division multiplexer 5 and the isolator 6 along with the signal beam, but is blocked by the bandpass filter 7. FIG. 1 shows the propagation path of the control beam with a single-dotted dashed line.

The excitation beam outputted from the excitation beam source 8 is inputted to the excitation monitor 9 where its power is measured, then is inputted to the wavelength division multiplexer 5. The excitation beam inputted to the wavelength division multiplexer 5 passes through the EDF 4 and the wavelength division multiplexer 3 to be inputted to the excitation beam monitor 12 where its power is measured. FIG. 1 shows the propagation path of the excitation beam with a double-dotted dashed line. The powers of the excitation beams measured by means of the excitation beam monitors 9, 12 are outputted as electrical signals which are respectively inputted to the amplifiers 10, 13. The amplifiers 10, 13 amplify each electrical signal by respectively pre-determined amplification rates, and the amplified electrical signals are inputted to the comparator 11. The output of the comparator 11 is inputted to the drive circuit 14.

As the power of the input signal beam $S_{in}$ decreases, the gain of the EDF 4 increases. In this case, the ratio between the power $P_1$ of the excitation beam which has passed through the EDF 4 and the power $P_0$ of the excitation beam which is inputted to the EDF 4 becomes greater. As $P_1:P_0$ increases, the output signal of the comparator 11 increases; consequently, the drive current outputted by the drive circuit 14 increases and the power of the control beam increases.

When the power of the control beam is raised, the lifetime of the upper state $^4I_{13/2}$ due to stimulated emission by the control beam becomes shorter than the relaxation time for spontaneous emission in the EDF 4. As a result, the inversion distribution immediately changes and the gain immediately drops. In this way, the gain of the EDF 4 quickly returns to the level it was at before the power of the input signal beam $S_{in}$ decreased. In other words, the ratio between the output signal of the amplifier 10 and the output signal of the amplifier 13 is held constant.

The relationship between the gain of the optical fiber amplifier and the ratio between the output signal of the amplifier 10 and the output signal of the amplifier 13 can be expressed by the following formula:

$$G = e^{(k \log_e \frac{P_1}{P_0} + C)} \tag{1}$$

wherein e is the root of the natural logarithm, G is the gain of the EDF 4, k is a proportionality constant, and C is an arbitrary constant. The constants k and C remain constant without depending upon either the power of the excitation beam or the power of the input signal beam $S_{in}$. Formula (1) shows that the present embodiment is able to hold the gain G constant by measuring the power of the excitation beam inputted to the EDF 4 and the power of the excitation beam after passage through the EDF 4, then controlling the control beam source 15 so that the value of their ratio is held constant.

B. Second Embodiment

Figure 2:
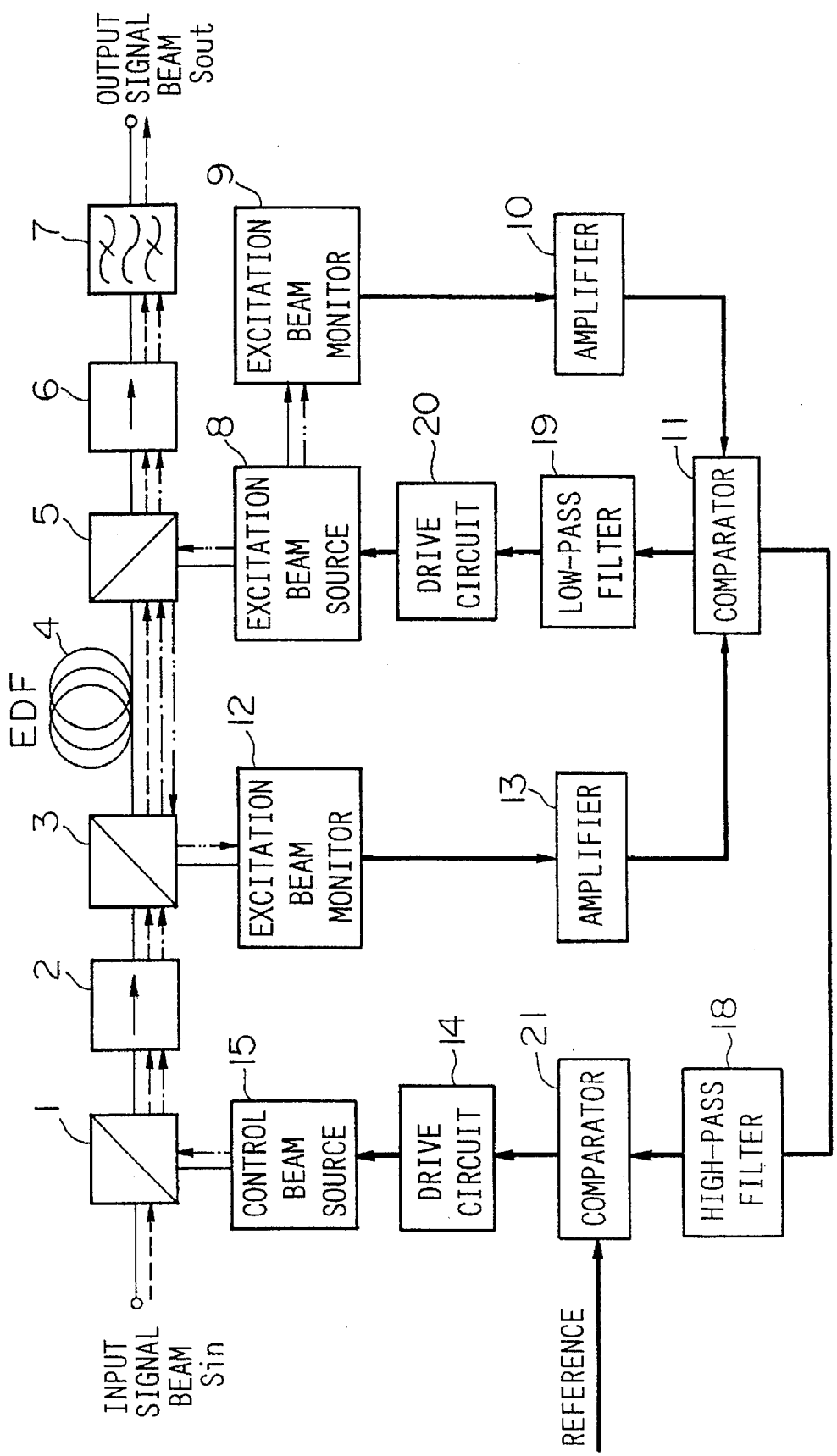
FIG. 2 is a block diagram showing the structure of an optical fiber amplifier according to the second embodiment of the present invention.

FIG. 2 is a block diagram showing a second embodiment of an optical fiber amplifier according to the present invention. In the diagram, the thin solid lines represent optical signal connections, the thick solid lines represent electrical signal connections. The parts which correspond to identical parts in FIG. 1 have been given the same reference numbers, and their explanations have been omitted.

In FIG. 2, the output of the comparator 11 is split into two beams. One beam passes through the high-pass filter 18 and the comparator 21 to be inputted to the drive circuit 14. The other beam passes through the low-pass filter 19 and the drive circuit 20 to be inputted to the excitation beam source 8.

In the present embodiment, a control signal is transmitted from the comparator 11 through the high-pass filter 18 to the comparator 12 in response to high-speed electrical fluctuations in the input beam $S_{in}$, where this electrical signal is compared with pre-set standards. The output signal is sent through the drive circuit 14 to the control beam source 15 in order to control the feedback to the optical fiber amplifier. Additionally, a control signal is transmitted from the comparator 11 through the low-pass filter 19 and the drive circuit 20 to the excitation beam source 8 in order to control the feedback to the optical fiber amplifier. As a result, high-speed gain control is able to be performed with respect to high-speed fluctuations of the input beam $S_{in}$ as with the first embodiment, while gain control is also possible with respect to low-speed large-amplitude electrical fluctuations of the input beam $S_{in}$ by means of feedback using the excitation beam source 8, which has a wider gain control range than feedback using the control beam source 15.

C. Third Embodiment

Figure 3:
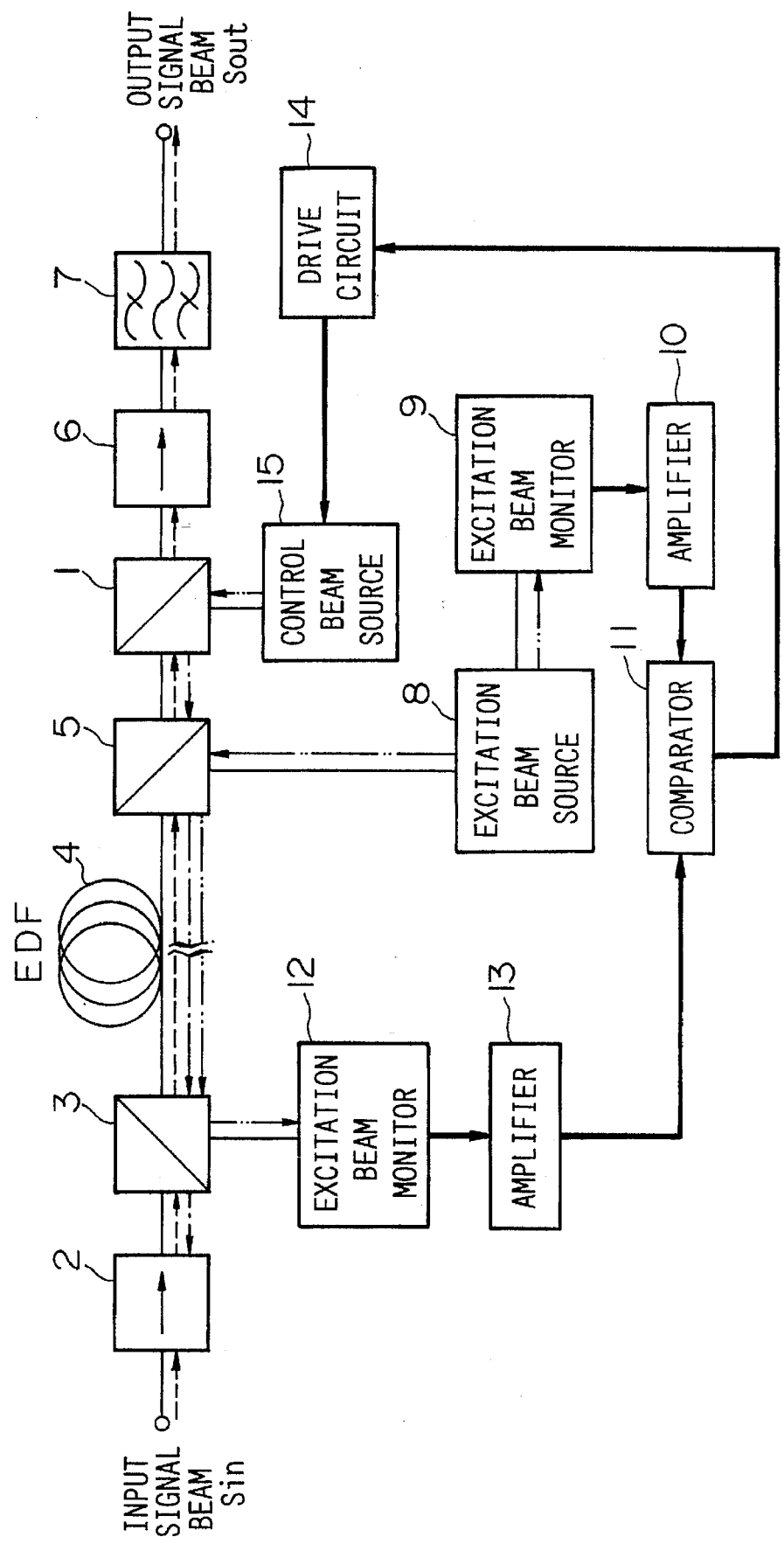
FIG. 3 is a block diagram showing the structure of an optical fiber amplifier according to the third embodiment of the present invention.

FIG. 3 is a block diagram showing an optical fiber amplifier according to the third embodiment of the present invention. In the diagram, the thin solid lines represent optical signal connections, the thick solid lines represent electrical signal connections. The parts which correspond to identical parts in FIG. 1 have been given the same reference numbers, and their explanations have been omitted. In FIG. 3, the input signal beam $S_{in}$ is inputted to the isolator 2. Additionally, an optical combiner 1 is inserted between the wavelength division multiplexer 5 and the isolator 6 of FIG. 1.

In the present embodiment, the control beam is sent from the control beam source 15 to the optical combiner 1, by way of which the control beam is inputted to the EDF 4 from the latter end of the wavelength division multiplexer 5. That is, the control beam is not inputted through the optical combiner 1 from the isolator 6 side. Additionally, the control beam cannot pass through the isolator 6. Consequently, the structure of the optical fiber amplifier can be made simple even if the attenuation rate of the blocking region of the BPF 7 is low, because the control beam practically does not enter either the input terminal or the output terminal.

D. Fourth Embodiment

Figure 4:
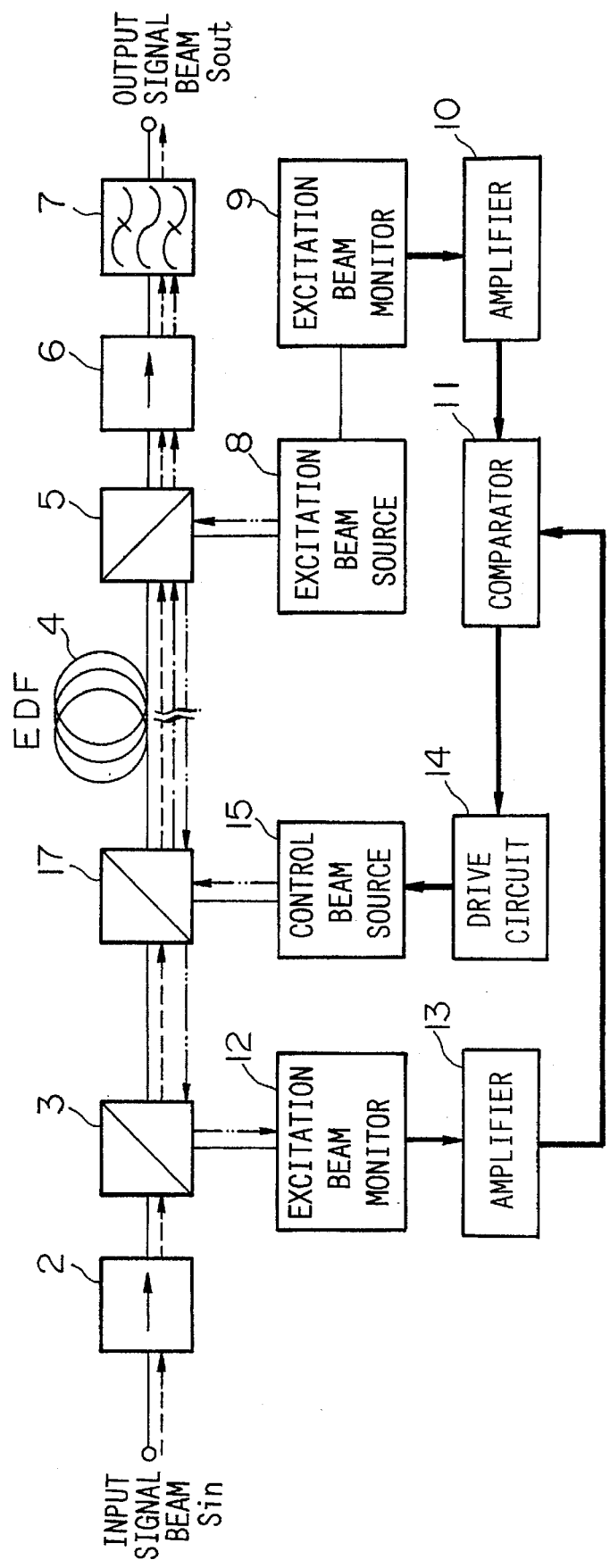
FIG. 4 is a block diagram showing the structure of an optical fiber amplifier according to the fourth embodiment of the present invention.

FIG. 4 is a block diagram showing an optical fiber aplifier according to the fourth embodiment of the present invention. In the diagram, the thin solid lines represent optical signal connections, the thick solid lines represent electrical signal connections. The parts which correspond to identical parts in FIG. 1 have been given the same reference numbers, and their explanations have been omitted. In FIG. 4, the input signal beam $S_{in}$ is inputted to the isolator 2. Additionally, a wavelength division multiplexer 17 has been inserted between the wavelength division multiplexer 3 and the EDF 4 of FIG. 1. In the present embodiment, the control beam generated by the control beam source 15 has a wavelength (for example, in the 0.8 µm band) at which excitation level absoprtion occurs in the EDF 4.

In the present embodiment, the control beam is inputted to the EDF 4 by way of the wavelength division multiplexer 17 as shown in FIG. 4. At this time, excitation level absorption causes a jump from the $^4I_{13/2}$ level to a higher state. Since the relaxation time for this excitation level absorption is extremely fast, the inversion distribution is able to be changed immediately so that the gain is able to be controlled at high speed. On the other hand, the portion of the control beam outputted from the EDF 4 without being absorbed is blocked by the BPF 7 so as not to be outputted. In this way, the frequency characteristics of the gain control can be improved by using excitation level absorption.

Finally, the above-mentioned embodiments, including the wavelengths of the signal beams and the control beams as well as the structure of the isolator, are merely examples for explaining the present invention which do not in any way restrict the scope of the present invention.

We claim:

1. An optical fiber amplifier, comprising:

a rare-earth-doped optical fiber for amplifying a signal beam;

optical excitation means for supplying an excitation beam to said rare-earth-doped optical fiber for amplifying said signal beam;

first measurement means for measuring the power of said excitation beam when inputted to said rare-earth-doped optical fiber;

second measurement means for measuring the power of said excitation beam when outputted from said rare-earth-doped otpcial fiber;

calculation means for calculating the ratio between the power measured by said first measurement means and the power measured by said second measurement means;

control beam supply means for supplying a control beam which controls the gain of said rare-earth-doped optical fiber; and control means for controlling the power of said control beam based on the results obtained by said calculation means.

2. An optical fiber amplifier, comprising:

a rare-earth-doped optical fiber for amplifying a signal beam;

optical excitation means for supplying an excitation beam to said rare-earth-doped optical fiber for amplifying said signal beam;

first measurement means for measuring the power of said excitation beam when inputted to said rare-earth-doped optical fiber;

second measurement means for measuring the power of said excitation beam when outputted from said rare-earth-doped otpcial fiber;

calculation means for calculating the ratio between the power measured by said first measurement means and the power measured by said second measurement means;

control beam supply means for supplying a control beam which controls the gain of said rare-earth-doped optical fiber;

first control means for controlling the power of said control beam based on high-frequency components in the results obtained by said calculation means; and second control means for controlling the power of said excitation beam based on low-frequency components in the results obtained by said calculation means.

3. An optical fiber amplifier according to claim 1, wherein the wavelength band of said control beam is within the gain band of said rare-earth-doped optical fiber.

4. An optical fiber amplifier according to claim 2, wherein the wavelength band of said control beam is within the gain band of said rare-earth-doped optical fiber.

5. An optical fiber amplifier according to claim 1, wherein said control beam is inputted to the end of said rare-earth-doped fiber to which said signal beam is inputted.

6. An optical fiber amplifier according to claim 2, wherein said control beam is inputted to the end of said rare-earth-doped fiber to which said signal beam is inputted.

7. An optical fiber amplifier according to claim 3, wherein said control beam is inputted to the end of said rare-earth-doped fiber to which said signal beam is inputted.

8. An optical fiber amplifier according to claim 1, wherein said control beam is inputted to the end of said rare-earth-doped fiber from which said signal beam is outputted.

9. An optical fiber amplifier according to claim 2, wherein said control beam is inputted to the end of said rare-earth-doped fiber from which said signal beam is outputted.

10. An optical fiber amplifier according to claim 3, wherein said control beam is inputted to the end of said rare-earth-doped fiber from which said signal beam is outputted.

11. An optical fiber amplifier according to claim 1, wherein the wavelength band of said control beam is within the excitation level absorption band of said rare-earth-doped optical fiber.

12. An optical fiber amplifier according to claim 2, wherein the wavelength band of said control beam is within the excitation level absorption band of said rare-earth-doped optical fiber.

13. An optical fiber amplifier according to claim 11, wherein said control beam is inputted to the end of said rare-earth-doped fiber to which said signal beam is inputted.

14. An optical fiber amplifier according to claim 12, wherein said control beam is inputted to the end of said rare-earth-doped fiber to which said signal beam is inputted.

15. An optical fiber amplifier according to claim 11, wherein said control beam is inputted to the end of said rare-earth-doped fiber from which said signal beam is outputted.

16. An optical fiber amplifier according to claim 12, wherein said control beam is inputted to the end of said rare-earth-doped fiber from which said signal beam is outputted.

* * * * *